April 16, 1940. F. J. REILLY 2,197,437
METHOD FOR CONDITIONING POTATOES
Filed Dec. 18, 1937 2 Sheets-Sheet 1
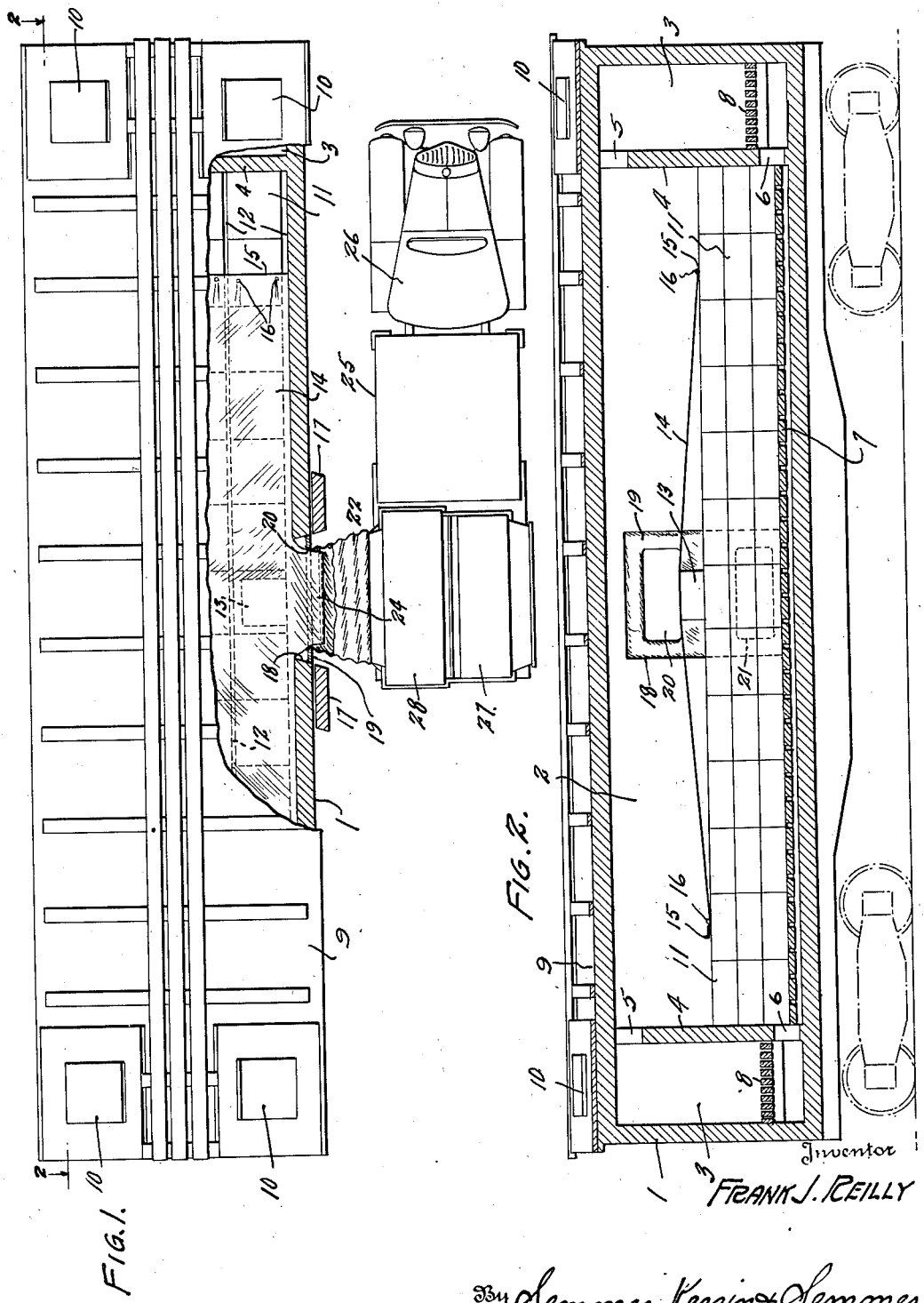
Inventor
FRANK J. REILLY
By Semmes, Keegin & Semmes
Attorneys April 16, 1940.　　　F. J. REILLY　　　2,197,437
METHOD FOR CONDITIONING POTATOES
Filed Dec. 18, 1937　　　2 Sheets-Sheet 2
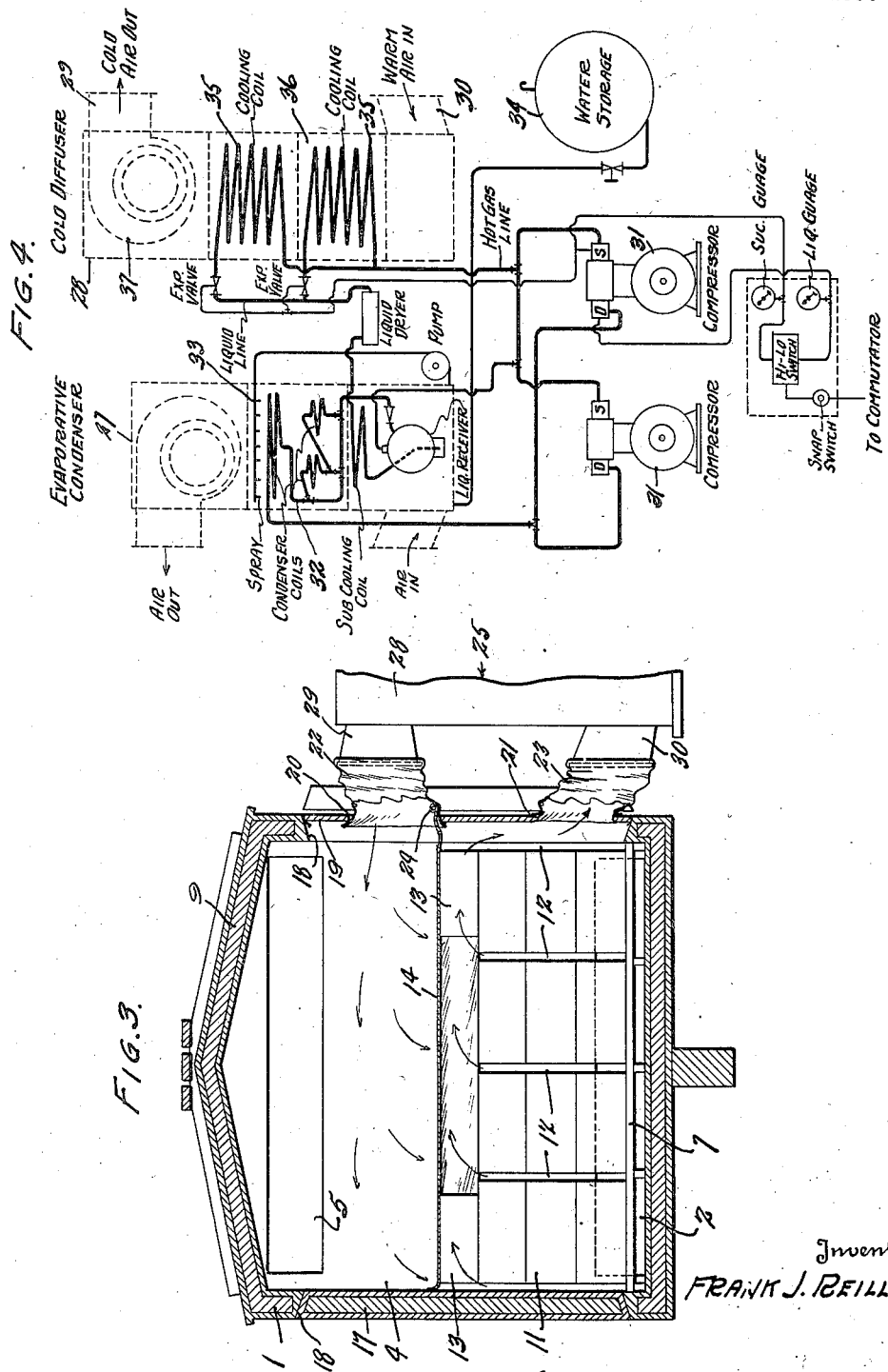

Patented Apr. 16, 1940

2,197,437

UNITED STATES PATENT OFFICE 2,197,437

METHOD FOR CONDITIONING POTATOES

Frank J. Reilly, Miami, Fla., assignor to General American Precooling Corporation, Chicago, Ill., a corporation of Delaware Application December 18, 1937, Serial No. 180,649

1 Claim. (Cl. 34—24)

My invention relates to the removal of moisture from the outer layers of vegetables, and more particularly has reference to a process for removing moisture from the outer layers of potatoes, by means of a stream of chilled air.

In the treatment of potatoes the problem has been to prevent sliming, which results from excess moisture collecting on the outer layers of the potatoes. At the packing houses, potatoes are washed before shipment, and this water remains on the surface of the potatoes and in the layers directly beneath the surface. If the humidity of the air is about 68 or 70 percent, the skin of the potatoes remains moist, due to lack of evaporation, thus promoting bacteria growth and decay, during shipment, which in turn produces a slime upon the potato.

Heretofore various attempts have been made to remove this moisture from potatoes to prevent this damage. For instance, methods have been devised for mechanically drying the potatoes by means of brushes or by passing them over absorbent surfaces. Attempts have also been made to remove the moisture from the air surrounding the potatoes by the use of lime or calcium chloride or by lowering the temperature by the use of ice. None of these, however, have proved successful, especially as applied to the southern grown potatoes, the growth of which has been forced.

One of the objects of my invention is to overcome these disadvantages.

Another object of my invention is to provide a process whereby the moisture is removed from the outer layers of potatoes by forcing a stream of chilled air through the storage chamber in which the potatoes have been placed.

Yet another object of my invention is to provide a process by means of which a stream of chilled air may be forced through a chamber, in which potatoes have been stored, and then withdrawn from the chamber and re-chilled before being re-introduced to the chamber.

My invention contemplates the removal of moisture from the outer layers of potatoes or other farm produce, which have been packed in suitable hampers and stored, by the introduction of a stream of chilled air through the storage chamber. This directed air is forced to flow over the surfaces of the stored produce and is then withdrawn, after it has absorbed the excess moisture from the stored vegetables. The air is then further chilled exteriorly of the chamber until most of the moisture which has been absorbed is condensed, and is re-introduced into the storage chamber. This conditioned air is allowed to circulate in this closed cycle until a point is reached where the surface moisture of the produce is entirely extracted and where any further moisture removal would result in the withdrawal of water from the potato body.

It is obvious from the above description that I have provided a process whereby the moisture on the outer surface of potatoes may be effectively and economically removed. While my invention may be used in connection with any type of chamber suitable for storing potatoes, it is apparent that it would be more economical in most cases to treat the potatoes after they have been placed in railroad cars ready for shipment.

In the drawings:

Figure 1 is a top plan view of a freight car with a conditioning unit in operative position at the side of the car, and showing the incoming and outgoing conduits in an operative position.

Figure 2 is a sectional view taken along line 2—2 of Figure 1 and looking in the direction of the arrows.

Figure 3 is a sectional view taken along line 3—3 of Figure 1, looking in the direction of the arrows.

Figure 4 is a diagrammatic view of my air conditioning unit.

As previously explained, my invention applies generally to removing moisture from the outer layers of farm produce that have been packed in hampers and placed in a storage chamber, but for purposes of illustration I will describe the removal of moisture from the outer layers of potatoes which have been packed in suitable containers and placed in a railroad car.

In the drawings, a freight car, designated generally by the numeral 1, is provided with storage chamber 2 and ice bunkers 3. The bunker walls 4 may be of solid construction, and provided with an upper opening 5 and a lower opening 6 or they may be of any suitable screen construction. A raised floor 7 may be provided for the storage chamber 2 and also drain racks 8 for the ice bunkers 3. The car 1 is also provided with a roof 9, equipped with ventilators 10.

As best shown in Figure 3, the lading 11 may consist of hampers, such as lugs or crates, which are filled with potatoes that have been washed and are ready for shipment.

When the car is being loaded the hampers are preferably placed in rows which are suitably spaced so as to leave longitudinal air passages 12 between the rows. The outer rows of the lading 11 carry at least one additional hamper or other support as shown at 13 to form a rest for a flexible sheet material 14. As best shown in Figure 2, this flexible sheet material 14 covers a considerable area of the top of the lading 11 and its extremities 15 are attached to the top of the lading by any suitable means as shown at 16. The usual doors 17 are positioned at the center of the car 1 on either side of the doorway 18 and in practicing my invention the doors on one side of the car are opened and there is inserted in the door-way 18 a false door 19. This false door 19 is made of any suitable material and is provided with an upper aperture 20 and a lower aperture 21.

When the interior of the car is to be conditioned, the flexible material 14 is fastened in position and the false door 19 is inserted in the door-way. A pair of extensible tubes 22 and 23 are then attached to the openings 20 and 21 respectively of the false door 19, and the outer edge of the flexible material 14 is inserted into the upper aperture 20 as shown at 24, to make an air tight fit. These extensible tubes 20 and 21 are carried by a portable air conditioning unit, designated generally by the numeral 25.

This air conditioning unit 25 consists of a truck 26 upon which is mounted an evaporative condenser 27 and a cold diffuser 28, provided with necessary operating units. The cold diffuser 28 is provided with an outlet duct 29, and an inlet duct 30 upon which are mounted the extensible tubes 22 and 23 respectively.

As best shown in Figure 4, the air conditioner 25 has associated therewith one or more compressors 31 which are designed to compress and force a suitable refrigerating agent into a condensing coil, designated generally by the numeral 32. This condensing coil is cooled by evaporation of moisture from a spray 33 which is supplied with water from a storage tank 34. After the heat of condensation has been removed from the refrigerating fluid in the condenser coils 32, the refrigerating fluid is forced to a cooling coil 35 where it expands with the absorption of heat, thereby cooling the cold diffuser chamber 36. After expansion it returns to the compressors 31 and the cycle is repeated. The cold diffuser 28 is also provided with a fan 37 by the operation of which warm air may be drawn through the inlet duct 30 over the cooling coils and out through the outlet duct 29.

It is obvious from the above description that if the fan 37 is placed in operation that air can be drawn from the interior of the car 1 through the lower aperture 21 of the false door 19 and then through the extensible tube 23 and the inlet duct 30 into the cold diffuser 28. The air then travels over the cooling coils 35 where it is chilled and a portion of its water vapor is condensed out of the air stream. This chilled and de-humidified air is then forced into the interior of the car by way of the duct 29, the extensible tube 22 and the upper aperture 20 of the false door 19.

As best shown in Figure 2, the air upon entering the car through the aperture 20 divides and travels towards both ends of the car above the flexible sheet material 14, which has previously been mentioned. This flexible material 14 may cover three-fourths of the area of the top line of the lading 11 or may be of any desired size. After reaching the outer extremities 15 of the sheet material 14, the conditioned air is drawn down through the lading 11 and travels by means of the air passages 12 through the lading and is withdrawn through the aperture 21 ir the false door 19. The moisture which has been absorbed from the potatoes may then be again condensed out of the air stream by chilling in the cold diffuser and the cycle repeated. The moisture is drained from the cold diffuser 36 by any suitable means as shown at 40.

During the entire operation, the hatches 10 in the roof 9 of the car 1 are kept closed and after the drying process is completed these hatches remain closed until the temperature of the interior of the car is the same as the temperature outside the car, to prevent moisture from the outside air from condensing on the potatoes.

I have found that the amount of water that should be removed appears to be a function of the atmospheric humidity. For instance, with the atmospheric humidity at 90 per cent, about 21 gallons of water are removed from the car; when the humidity is 80 per cent, about 19 gallons are removed; when the humidity is 70 per cent, about 17 gallons should be removed.

A practical way of determining when the proper amount of moisture has been removed is obtained by measuring the amount of water which drains from the cold diffuser chamber 36. When there is a noticeable drop in the amount of water that is being condensed out of the air which is flowing over the cooling coils, substantially all of the surface moisture has been removed and further operation of my process merely results in the extraction of the body moisture, which should be avoided. During this process, an air stream with a velocity of from 8,000 to 10,000 cubic feet per minute is desirable.

It is apparent from the above description that I have provided a process whereby potatoes, that have been washed and are ready for shipment, may have their surface moisture economically removed. By the use of my apparatus, a chilled air stream can be directed to all parts of the car and the surfaces of all the potatoes are thus kept constantly bathed in a stream of air, which has been chilled to remove its moisture content and therefore will readily absorb any moisture in which it comes in contact.

While these potatoes can be treated in any suitable storage chamber by my process I have described, for purposes of illustration, the treatment of the potatoes after they have been packed and are ready for shipment. By thus treating the potatoes after they are stored in the railway cars, no extra handling is necessary and no time is lost in shipment.

By removing the surface moisture from potatoes before shipment, all chances of loss through decay are avoided and the potatoes upon arrival at their destination are in condition to obtain the best possible price for the shipper.

While I have described, for purposes of illustration, one form of my invention, it is obvious that it is not to be confined to the precise details of construction herein set forth. Neither is my process limited to the treatment of potatoes, as it is apparent that moisture may be removed from the outer layers of other farm produce by the use of my apparatus and process.

I therefore intend that my invention be only limited by the scope of the appended claim.

I claim:

A method of removing moisture from the outer layers of potatoes, which constitute the lading of a railroad car, comprising covering a portion of the load with a substantially air impervious member by securing opposite end portions of the member to the load and raising the center portion, chilling air outside the car, introducing the air to the car at a point directly above the raised portion of the said cover, causing the air to flow over the potatoes by withdrawing it from the car at a point directly beneath the raised portion of the said cover and below the top line of the load, re-chilling the air outside of the car to condense the moisture which it has absorbed, and then reintroducing the air into the car in a closed cycle.

FRANK J. REILLY.